May 14, 1968 N. M. RASKHODOFF ET AL 3,383,458

MODULAR POWER DISTRIBUTION SYSTEM

Filed Aug. 30, 1965 3 Sheets-Sheet 1

INVENTORS
NICHOLAS M. RASKHODOFF
DOUGLAS A. VENN

BY

ATTORNEY

MODULAR POWER DISTRIBUTION SYSTEM

Filed Aug. 30, 1965 3 Sheets-Sheet 2

INVENTORS
NICHOLAS M. RASKHODOFF
DOUGLAS A. VENN

BY R. A. Sciascia

ATTORNEY

INVENTORS
NICHOLAS M. RASKHODOFF
DOUGLAS A. VENN
BY
ATTORNEY 3,383,458

MODULAR POWER DISTRIBUTION SYSTEM

Nicholas M. Raskhodoff, Cheverly, Md., and Douglas A. Venn, Washington, D.C., assignors to the United States of America as represented by the Secretary of the Navy Filed Aug. 30, 1965, Ser. No. 483,890

6 Claims. (Cl. 174—72)

ABSTRACT OF THE DISCLOSURE

Bus bar assembly units which may be interconnected to form an assembly of any desired length. Each assembly unit comprises a plurality of bus bars separated by insulating strips with the ends of each bar having a ship lap form. A multi-pin connector may be connected to the bus bars by including in each bus bar a plurality of holes into which leads from the connector may be soldered. Compressible elastomers are attached to the bus bar ends to provide additional insulation at the joints.

The invention described herein may be manufactured and used by or for the Government of the United States of America for governmental purposes without the payment of any royalties thereon or therefor.

The present invention relates to a system for the distribution of electric power and more particularly to the construction of a bus bar assembly unit wherein a plurality of such units may be conveniently and firmly interconnected to form a bus bar assembly of any desired length.

In the past, power distribution in varying-width cabinet assemblies for packaging electronics was accomplished by means of terminal blocks and individual insulated conductors connected between those terminal blocks which were mounted on the cabinet assembly. This type of power distribution required a large amount of space. In addition, most of the prior art bus bar assemblies do not lend themselves to electrical connection with multi-pin connectors. Although such devices have served their purpose, they have not proved entirely satisfactory under all conditions of service due to the complexity of the interconnections between the bus bar and the electronics to which power is to be distributed, and also due to the probability of wiring errors when this type of device is used. A bus bar assembly has been needed wherein a convenient interconnection among similar bus bar assembly units can be made so that a series of units may be interconnected to form a bus bar assembly of any desired length and which is compatible with standard multi-pin connectors which may be readily accepted by the bus bar units.

The general purpose of this invention is to provide a bus bar assembly unit embracing all the advantages of similarly employed units and which possesses none of their disadvantages. In order to attain this, the present invention provides a bus bar unit having a plurality of parallel electrical conductors insulated from each other and having ends of ship lap construction to provide a flush joint when one such unit is connected with a similar bus bar unit. The end portions of the bus bar strips have apertures therein as do the insulators between the bus bar strips through which a coupling bolt passes to interlock one bus bar unit to the next-succeeding bus bar unit. An insulating sleeve made of any suitable insulating material surrounds the coupling bolt to isolate the coupling bolt from the bus bar strips. Each bus bar strip has a number of shallow holes on its edge to accept the pins or contacts of a multi-pin connector which serves as the pick-off device for bringing electric power from the bus bar assembly to electronic circuitry to which power is to be distributed. In the process of interconnecting a connector with a bus bar assembly unit, a shallow hole is pre-soldered to form a miniature solder pot for the individual connector pins inserted within it when the connector is mounted on the bus bar unit. After the connector is in place, the entire assembly is placed in an oven whose temperature is then raised above the melting point of the solder within the shallow holes of the individual bus bar strips. All of the pins are thus electrically connected to the individual bus bar strips by this soldering process in a single operation.

An object of the present invention is to provide a novel bus bar modular construction wherein a series of bus bar assembly units may be interconnected to form a bus bar assembly of any desired length.

Another object of this invention is to provide a bus bar assembly unit having a novel construction which provides a flush joint so that a bus bar of uniform thickness is formed when each bus bar strip is interconnected with its respective bus bar strip of the next-succeeding unit.

A further object of the invention is to provide a bus bar assembly unit which may be interconnected with a standard multi-pin connector which is mounted upon and soldered to the unit.

Still another object is to provide a bus bar assembly unit which may be constructed in varying lengths to permit convenient extension of the bus bar assembly to provide electrical power to additional cabinet assemblies as they are added.

A further object is to provide a method of interconnecting a multi-pin connector to the bus bar strips of a unit in a single soldering operation.

Other objects and many of the attendant advantages of this invention will be readily appreciated as the same becomes better understood by reference to the following detailed description when considered in connection with the accompanying drawings in which like reference numerals designate like parts throughout the several views thereof and wherein.

Figure 1:
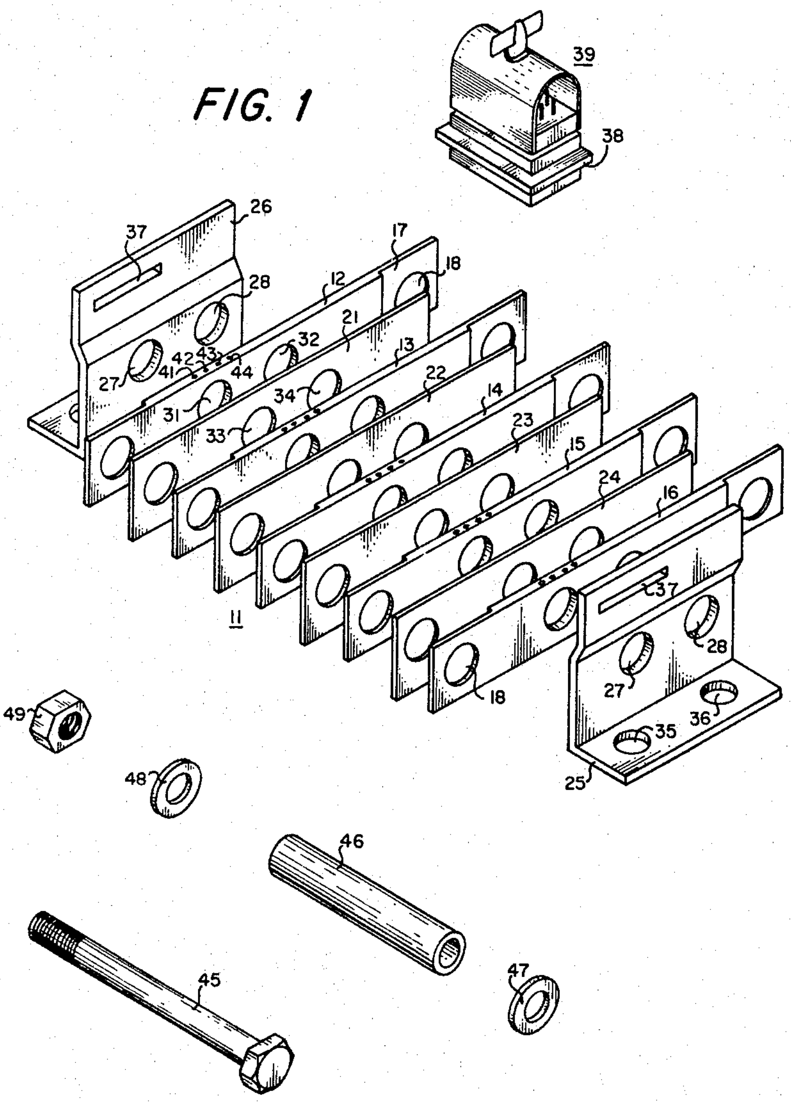
FIG. 1 shows an exploded view of a bus bar assembly unit of this invention.

Referring now to the drawings, there is shown in FIG. 1 an exploded perspective view of a bus bar assembly unit 11 of this invention having a plurality of parallel bus bar strips 12–16 which are electrically conductive strips of flat, rectangular configuration having end portions of ship lap construction, i.e., having a cut away 17 for a portion of the length on both ends but on opposite sides of the bus bar strip to enable a flush joint to be made with similar strips. Insulating strips 21–24 of glass fiber construction bonded with silicone resin, or any other suitable electrical insulating material, are interposed between each of the bus bar strips to provide spacing and electrical isolation between each of the bus bar strips. The insulating strips should be capable of electrically isolating the bus bar at the highest voltage and current of interest and should also be capable of withstanding the high temperatures of the soldering process which will be described hereinafter. Each of the bus bar strips 12–16 have an aligned aperture 18 in the cut away end portion 17. The end portions have chamfered edges to allow easy engagement of interconnecting units. A pair of brackets 25 and 26 are attached to the bus bar assembly unit with one bracket on each side of the unit and having a pair of apertures 27 and 28 therein aligned with a pair of apertures 31 and 32, respectively, in the mid portion of each of the bus bar strips. The interposed insulating strips 21–24 also have a corresponding pair of apertures 33 and 34 aligned with the apertures 31 and 32 of bus bar strips 12–16 and brackets 25 and 26. Brackets 25 and 26 also have a second pair of apertures 35 and 36 for mounting the bus bar unit on any desired assembly and also have a slot 37 at the end opposite the mounting apertures for receiving the lip 38 of multi-pin connector 39 and for maintaining connector 39 interconnected with bus bar assembly unit 11. A suitable connector useful in most applications is the Nike-Zeus type connector manufactured by Cinch Manufacturing Co.

Each bus bar strip 12–16 is shown with four shallow openings or holes 41–44 drilled into an edge which act as a female receptacle for receiving the pins of multi-pin connector 39. Any number of holes may be drilled into the edge of the bus bar strip depending upon the pin configuration of the connector employed. The number of holes drilled is limited only by the length of the strip so that a connector with any desired number of pins may be received by the bus bar assembly unit or so that more than one connector may be mounted on a unit. Where more than one connector is employed, a wider bracket 25 or 26 may be needed having either a wider slot 37 or a greater number of slots corresponding to the number of connectors employed.

The individual bus bar strips 12–16, their interposed insulating strips 21–24, and brackets 25 and 26 are fastened together by means of a coupling bolt 45, inserted through each series of aligned apertures. A hollow cylindrical insulating sleeve 46 surrounds the coupling bolt to isolate the coupling bolt from the bus bar strips. Washers 47 and 48 are shown each of which is to be positioned on the coupling bolt 45 at each side of the unit, along with the nut 49 which is to be fastened to bolt 45. In many applications it may be desirable to allow for unit misalignment. This is easily accomplished by elongating the apertures in the end portions of the bus bar strips and insulating strips.

The bus bar strips of this invention may be made of copper or any other suitable electrical conductor such as gold plated aluminum, a conductive plastic, a metal plated plastic, and so forth.

Figures 2, 3:
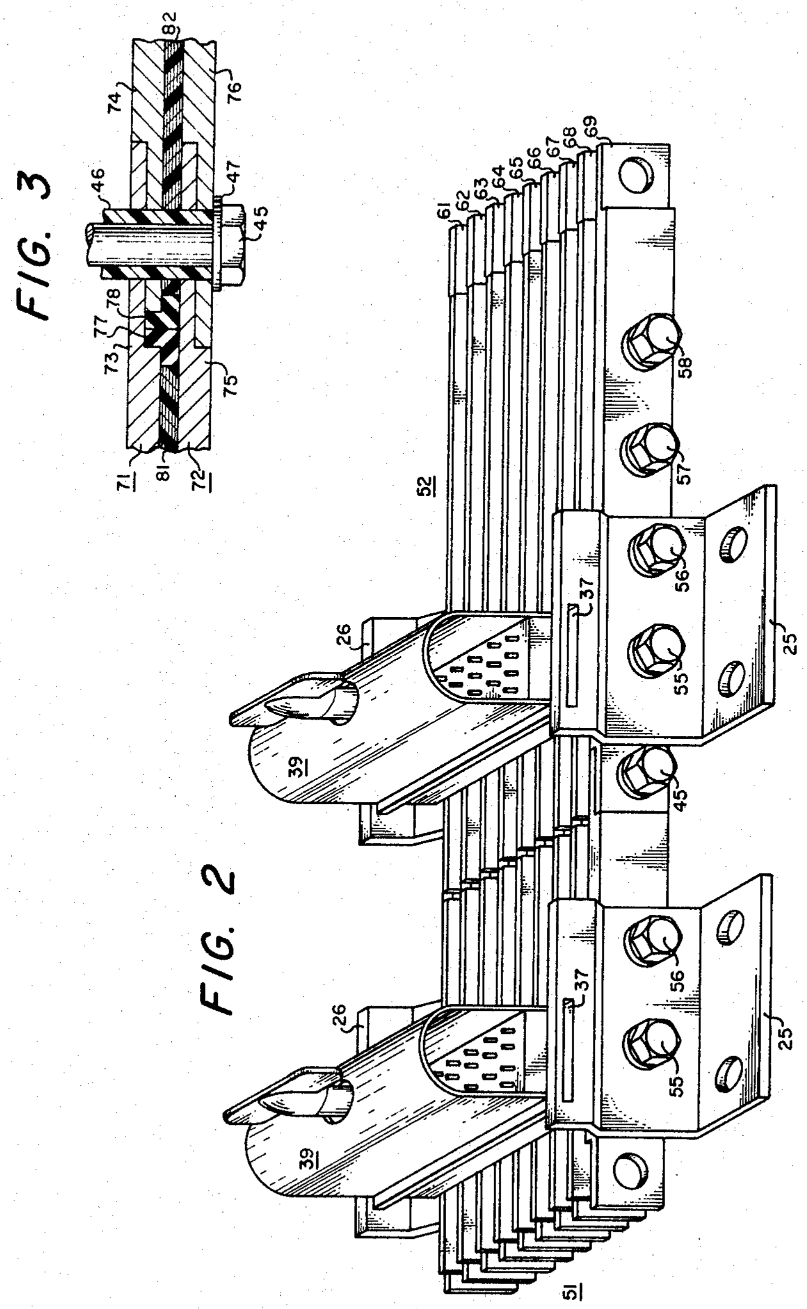
FIG. 2 illustrates a pair of interconnected bus bar assembly units having a multi-pin connector associated therewith.
FIG. 3 is a diagrammatic view of a particular joint of this invention.

FIG. 2 illustrates a pair of complete bus bar assembly units 51 and 52 each of different length and interconnected to form a bus bar assembly having a multi-pin connector 39 on each bus bar assembly unit fitting into slots 37 of brackets 25 and 26. The ship lap joint provides a flush interconnection which is approximately the same thickness as the midportion of a bus bar strip, thus allowing a bus bar unit to be formed comprising a series of interconnected bus bar strips wherein the bus bar unit is of uniform thickness along its entire length. The bus bar assembly shown in FIG. 2 may be conveniently extended to any desired length by adding bus bar assembly units of specific incremental length to match the width of any electrical cabinet unit or any other electronic packaging unit. Power may be distributed to electronic circuitry along the length of the bus bar assembly by employing a multi-pin connector 39 to tap power along the length of the bus bar assembly. Each bus bar assembly unit is coupled to its next-succeeding bus bar assembly unit by means of a coupling bolt 45 inserted through the joint connection. The brackets are also coupled to the assembly by similar bolts 55 and 56 which also serve to fasten the strips together. Additional bolts 57 and 58 are used for longer assembly units to fasten the bus bar and insulating strips. In a bus bar assembly as shown in FIG. 2, the bus bar strips are interconnected in series to form a plurality of bus bar units each of which carries a given voltage or current similar to or different from the voltage or current of the adjacent bus bar unit, depending upon the particular application or power distribution desired.

It is to be noted that bus bar strips 12 and 16 of FIG. 1 and bus bar strips 61 and 69 of FIG. 2 are shown not insulated from the mounting brackets since in many applications those bus bar strips, i.e., those at the ends of the bus bar assembly unit, are employed as ground buses and are at the same potential as the mounting brackets. In applications where the bus bar strips at the ends of the assembly unit are not at the same potential as the brackets, insulating strips should be provided between those bus bar strips and the mounting brackets.

FIG. 3 illustrates a joint wherein two assembly units are interconnected with additional insulation. Only two bus bar units 71 and 72 are shown. Bus bar unit 71 comprises bus bar strips 73 and 74 while bus bar unit 72 comprises bus bar strips 75 and 76. In this joint configuration, compressible elastomers 77 and 78 of angular configuration are attached or molded to the corners of bus bar strips 73 and 74, respectively, to provide additional insulation at the joints. This additional compressible insulation is positioned between an insulating strip of one bus bar assembly unit and a corresponding insulating strip of a next-succeeding bus bar assembly unit. This compressible insulation at the joint prevents the entry of water or any foreign matter which could cause arcing or a short between the bus bars. This additional insulation may not be necessary in many applications.

In accordance with the process for electrically interconnecting the multi-pin connector 39 to the bus bar assembly unit, each of the shallow openings 41–44 which extend partially through the edge of the bus bar strip are pre-soldered to form a miniature solder pot for an individual connector pin. The multi-pin connector is then positioned adjacent to the assembly unit so that the pins of the connector are aligned with their respective pre-soldered openings. The entire bus bar assembly unit together with the multi-pin connector is then placed in an oven whose temperature is raised above the melting point of the solder within the pre-soldered shallow openings in the individual bus bar strips and then the connector is urged toward the bus bar assembly unit so that each pin of the connector enters into its respective opening. The entire assembly is then cooled so that the connector is soldered and fixed to the bus bar assembly unit. As an alternative, the connector may also be positioned above the assembly unit so that the pins of the connector are in intimate contact with their respective pre-soldered openings whereby the pins enter their respective openings automatically when the solder in the openings has melted. This may be accomplished by simply resting the connector upon the assembly unit so that the pins are partially in their respective openings. With this alternative, the step of urging the connector toward the bus bar assembly unit is eliminated since the force of gravity urges the connector toward the bus bar assembly unit as the solder melts. By means of the process set forth herein, the connector is securely fixed to the bus bar assembly unit and an efficient electrical connection is provided. After the initial pre-soldering operation, a single soldering operation is employed to electrically interconnect the multi-pin connector to the bus bar assembly unit.

Figure 4:
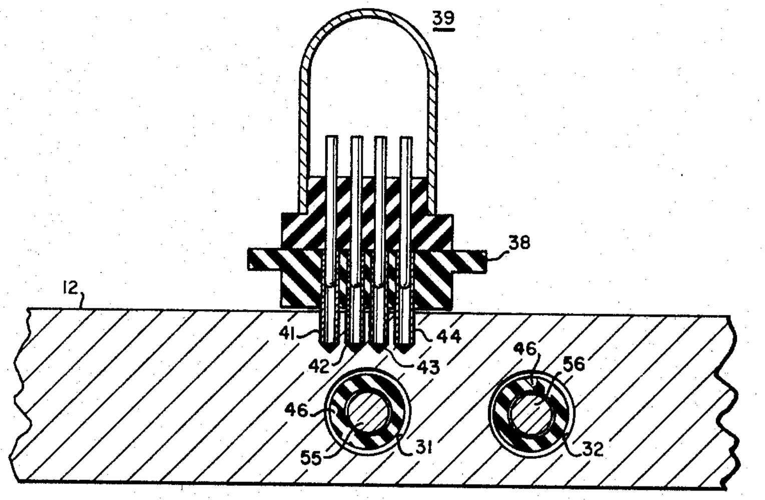
FIG. 4 shows a section view taken lengthwise of a bus bar showing how the multi-pin connector is joined to the bus bar.

FIG. 4 shows a section view which illustrates how connector 39 is joined to bus bar 12. It can be seen that holes 41, 42, 43 and 44 in bus bar 12 receive the pins from the multi-pin connector. Other similar holes in bus bars 13–16 receive other pins from the connector.

It is to be recognized that the multi-pin connector may be interconnected to the bus bar assembly unit by any other suitable process such as by resistance welding. If desired, a plug-in type connection may be employed to couple the connector and assembly unit where a permanent connection is not required.

In summary, the present invention provides an assembly comprising a multi-pin connector and a bus bar assembly unit having a plurality of parallel bus bar strips of ship lap form having openings in their edge forming a receptacle for receiving the pins of the multi-pin connector. The ship lap form of the bus bar strips provides a flush joint of uniform thickness when a bus bar assembly unit is interconnected with a next-succeeding assembly unit. This invention also provides methods for coupling the connector to the assembly unit including a method for interconnecting the assembly which comprises pre-soldering the openings of the bus bar strips, positioning the multi-pin connector so that the pins are aligned with and adjacent to their respective openings, then heating the entire assembly until the solder melts so that the connector pins enter their respective openings and then cooling the entire assembly so that the connector is soldered and fixed to the assembly unit.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An electrical power distribution system having a plurality of interconnected bus bar assembly units wherein each unit is adapted to be mounted on any desired surface and wherein the bus bars of each unit are interleaved with the bus bars of the next-succeeding unit, with each bus bar assembly unit comprising:
- a plurality of parallel bus bars, with each of said bus bars comprising a flat electrically conductive strip having apertured end portions of ship lap form,
- means spacing said bus bars comprising an insulator fixedly positioned between each pair of parallel bus bars, said insulator comprising a flat insulating strip extending substantially along the entire length of a bus bar and further including a compressible insulating means between the insulating strip of a bus bar unit and the corresponding insulating strip of the next-succeeding bus bar unit, said compressible insulating means comprising a first angular member attached to a bus bar strip of a unit and a second angular member attached to a corresponding bus bar strip of the next-succeeding unit,
- means rigidly fastening said bus bars in a fixed parallel relationship,
- an electrical connector having a plurality of pins,
- means mounting said assembly unit on any desired surface and mounting said connector on said assembly unit with said pins in electrical contact with their respective bus bars, and
- insulated bolt means fastening an assembly unit to a next-succeeding assembly unit wherein said bolt means passes through the apertured end portion of the bus bars of an assembly unit and the apertured end portion of the next-succeeding assembly unit.

2. An electrical power distribution system having a plurality of interconnected bus bar assembly units wherein each unit is adapted to be mounted on any desired surface and wherein the bus bars of each assembly unit are interleaved with the bus bars of the next-succeeding assembly unit, with each bus bar assembly unit comprising:
- a plurality of parallel bus bars, with each of said bus bars comprising a flat electrically conductive strip having apertured end portions of ship lap form,
- means spacing said bus bars comprising a flat insulating strip positioned between each pair of parallel bus bars and compressible insulating means between the insulating strip of a bus bar assembly unit and the corresponding insulating strip of the next-succeeding bus bar assembly unit, said compressible insulating means comprising a first angular member attached to a bus bar strip of an assembly unit and a second angular member attached to a corresponding bus bar strip of the next succeeding assembly unit,
- means mounting said assembly unit on any desired surface, and
- insulating bolt means fastening an assembly unit to a next-succeeding assembly unit wherein said bolt means passes through the ship lap form apertured end portion of the bus bars in a first assembly unit and through the corresponding ship lap form apertured end portion of the bus bars in the next succeeding assembly unit.

3. A bus bar assembly unit comprising:
- a plurality of parallel bus bars, each of said bus bars comprising a flat electrically conductive strip having end portions of ship lap form adapted to over-lap complementary end portions of bus bars in an adjacent bus bar assembly unit,
- insulating means fixed between each pair of parallel bars to space said bus bars, said insulating means comprising a flat insulating strip extending substantially along the entire length of a bus bar and further including an angular compressible insulating means attached to the ship lap formed end portion of a bus bar, and
- means rigidly fastening said bus bars in a fixed parallel relationship.

4. The bus bar assembly unit as set forth in claim 3 further including:
- an electrical connector having a plurality of pins, and
- means mounting said connector on said parallel bus bars with said pins in electrical contact with said bus bars.

5. An electrical power distribution system having a plurality of interconnected bus bar assembly units wherein each unit is adapted to be mounted on any desired surface and wherein the bus bars of each unit are interleaved with the bus bars of the next-succeeding unit, with each bus bar assembly unit comprising:
- a plurality of parallel bus bars, with each of said bus bars comprising a flat electrically conductive strip having apertured end portions of ship lap form,
- means spacing said bus bars comprising an insulator fixedly positioned between each pair of parallel bus bars, said insulator comprising a flat insulating strip extending substantially along the entire length of a bus bar and further including a compressible insulating means between the insulating strip of a bus bar assembly unit and the corresponding insulating strip of the next-succeeding bus bar assembly unit,
- means rigidly fastening said bus bars in a fixed parallel relationship,
- an electrical connector having a plurality of pins,
- means mounting said assembly unit on any desired surface and mounting said connector on said assembly unit with said pins in electrical contact with their respective bus bars, and
- insulated bolt means fastening a unit to a next succeeding unit with the ship lap formed bus bar portions of one unit overlapping the complementary ship lap formed bus bar portions of the next-succeeding unit and wherein said bolt means passes through the apertured end portion of the bus bars of an assembly unit and its interleaved next-succeeding assembly unit.

6. An electrical power distribution system having a plurality of interconnected bus bar assembly units adapted to be mounted on any desired surface wherein the bus bars of any given assembly unit are interconnected with the bus bars of the next-succeeding assembly unit at a flush joint for forming an effective electrical connection between a bus bar of said given assembly unit and the corresponding bus bar of said next-succeeding assembly unit wherein each assembly unit comprises:
- a plurality of parallel bus bars, with each of said bus bars comprising a flat, electrically conductive strip having end portions of ship lap form with apertures therethrough, insulator means spacing said bus bars and having apertures therein aligned with the apertures of said bus bars, means rigidly fastening said bus bars in a fixed parallel relationship, wherein the thickness of said bus bar and its related interconnected bus bar along a plurality of assembly units is of uniform thickness and unaffected by the joint between each assembly unit, fastening means passing through the aligned apertures at said joint maintaining said assembly unit and its next-succeeding assembly unit in an interconnected relationship with the complementary ship lap portions engaging each other, means connected to said assembly unit for mounting said assembly unit on any desired surface, receptacle means integral with each of said bus bars for receiving an electrical element so that electrical contact is made between said electrical element and its respective bus bar, and an electrical connector having a plurality of pins, wherein said means for mounting said assembly unit on any desired surface maintains said electrical connector in electrical engagement with said bar assembly unit and wherein said pins of said electrical connector are received into said receptacle means.

References Cited

UNITED STATES PATENTS

| | | | |
|---|---|---|---|
| 2,964,586 | 12/1960 | Sillman. | |
| 2,969,421 | 1/1961 | Scott | 174—117 |
| 3,104,276 | 9/1963 | Cataldo et al. | |
| 3,170,747 | 2/1965 | Herrmann et al. | |
| 3,189,680 | 6/1965 | Stanback. | |

DARRELL L. CLAY, *Primary Examiner.*